US008787188B1

(12) United States Patent
Shmidt (10) Patent No.: US 8,787,188 B1
(45) Date of Patent: Jul. 22, 2014

(54) MERGING FOR WIRELESS ACCESS POINTS (75) Inventor: Dmitry Shmidt, Sunnyvale, CA (US)

(73) Assignee: Google Inc., Mountain View, CA (US)

(*) Notice: Subject to any disclaimer, the term of this patent is extended or adjusted under 35 U.S.C. 154(b) by 182 days.

(21) Appl. No.: 13/250,975

(22) Filed: Sep. 30, 2011

Related U.S. Application Data (63) Continuation of application No. 12/984,809, filed on Jan. 5, 2011, now Pat. No. 8,634,349.

(60) Provisional application No. 61/294,076, filed on Jan. 11, 2010.

(51) Int. Cl.
*H04L 12/28* (2006.01)
*H04L 12/26* (2006.01)

(52) U.S. Cl.
CPC ...................................... *H04L 43/00* (2013.01)
USPC .......................................................... 370/252

(58) Field of Classification Search
CPC ...................................................... H04L 43/00
USPC .......................................................... 370/252
See application file for complete search history.

(56) References Cited

U.S. PATENT DOCUMENTS

| | | | |
|---|---|---|---|
| 5,140,157 A | 8/1992 | Ohshima et al. | |
| 5,210,785 A | 5/1993 | Sato et al. | |
| 5,594,782 A | 1/1997 | Zicker et al. | |
| 5,758,291 A | 5/1998 | Grube et al. | |
| 5,859,879 A | 1/1999 | Bolgiano et al. | |
| 5,920,549 A | 7/1999 | Bruckert et al. | |
| 6,807,163 B1 | 10/2004 | Shi | |
| 2006/0230150 A1 | 10/2006 | Roy | |
| 2007/0054670 A1* | 3/2007 | Kalika et al. | 455/446 |
| 2007/0066304 A1* | 3/2007 | Lee | 455/436 |
| 2007/0218997 A1* | 9/2007 | Cho | 463/42 |
| 2007/0249291 A1* | 10/2007 | Nanda et al. | 455/73 |
| 2009/0011773 A1* | 1/2009 | Balachandran et al. | 455/456.1 |
| 2009/0164115 A1* | 6/2009 | Kosakowski et al. | 701/201 |
| 2009/0180390 A1* | 7/2009 | Lin | 370/252 |
| 2009/0245176 A1* | 10/2009 | Balasubramanian et al. | 370/328 |
| 2010/0090901 A1* | 4/2010 | Smith et al. | 342/451 |
| 2012/0309420 A1* | 12/2012 | Morgan et al. | 455/456.1 |

* cited by examiner

*Primary Examiner* — Mark Rinehart
*Assistant Examiner* — Christopher R Crompton
(74) *Attorney, Agent, or Firm* — Fish & Richardson P.C.

(57) ABSTRACT

A method for tracking wireless access points from a computing device. The method includes scanning in a first scan to identify wireless access points that are within wireless communication of the computing device, and scanning in one or more subsequent scans to identify wireless access points that are within wireless communication of the computing device. The method also includes creating a group of wireless access points that includes a combination of wireless access points that were identified in the first scan or in the one or more subsequent scans, and providing to a user of the computing device a list of wireless access points that includes members of the group of wireless access points that have been identified in a predetermined period of multiple scans for wireless access points.

21 Claims, 5 Drawing Sheets

|  | Access Points | | | | | | | | List |
|---|---|---|---|---|---|---|---|---|---|
|  | 1 | 2 | 3 | 4 | 5 | 6 | 7 | 8 |  |
| 1 | X | X |   |   |   |   |   |   | 1,2 |
| 2 |   | X | X | X | X |   |   |   | 1,2,3,4,5 |
| 3 |   | X | X |   | X |   |   |   | 1,2,3,4,5 |
| 4 |   |   | X | X | X |   |   |   | 1,2,3,4,5 |
| 5 |   | X |   |   |   |   |   |   | 2,3,4,5 |
| 6 |   |   |   |   |   |   |   |   | 2,3,4,5 |
| 7 | X |   |   |   |   | X |   |   | 1,2,3,4,5,6 |
| 8 | X |   |   |   |   | X | X | X | 1,2,6,7,8 |
| 9 | X |   |   |   |   |   |   |   | 1,6,7,8 |
| 10 | X |   |   |   |   |   |   |   | 1,6,7,8 |
| 11 | X | X |   | X |   |   |   |   | 1,2,4,6,7,8 |
| 12 |   | X | X | X | X |   |   |   | 1,2,3,4,5 |
| 13 |   |   |   |   |   |   |   |   | 1,2,3,4,5 |
| 14 |   |   |   |   |   | X | X | X | 1,2,3,4,5,6,7,8 |
| 15 |   |   |   |   |   |   | X |   | 2,3,4,5,6,7,8 |
| 16 | X |   |   |   |   |   | X |   | 1,6,7,8 |
| 17 | X |   |   |   |   |   | X |   | 1,6,7,8 |
| 18 |   |   |   |   |   |   |   |   | 1,7 |
| 19 |   | X |   | X |   |   |   |   | 1,2,4,7 |
| 20 |   |   |   | X |   |   |   |   | 1,2,4,7 |

Scans

MERGING FOR WIRELESS ACCESS POINTS

CROSS-REFERENCE TO RELATED APPLICATION

This application is a continuation of U.S. Application Serial No. 12/984,809, filed on Jan. 5, 2011, which claims priority to U.S. Provisional Application Ser. No. 61/294,076, filed Jan. 11, 2010, the entire contents of which are incorporated herein by reference.

TECHNICAL FIELD

This document relates to tracking of wireless access points that may be available around a computing device, and especially a mobile computing device that is moving.

BACKGROUND

Mobile computing continues to grow quickly as mobile devices, such as smart phones, add more power and more features. Users of such devices may now access various services on the Internet, such as mapping applications, electronic mail, text messaging, various telephone services, general web browsing, music and video viewing, and other such services. Mobile devices can take forms such as smart phones, tablets and netbooks.

Mobile devices frequently obtain network access wirelessly. While certain access may occur via private data networks run by telecommunication providers, such as 3G networks, that access may carry with it a relatively high monthly or per minute fee. Mobile devices may also communicate wirelessly through standard WiFi access points. Such access points may be made available for free or for a charge in locations where computer users are likely to congregate momentarily, such as airport terminals, coffees shops, and buildings on university campuses. A mobile device may be set up in such a situation to scan for access points for which a beacon signal is available, and may report to a user on a screen of their device the names of networks that are within the wireless vicinity of the mobile device. Scanning can involve tuning a wireless interface to detect wireless signals broadcast at various frequencies (e.g., 2.4 GHz, 5 GHz), on various channels (e.g., channels 1-11), and using various wireless standards (e.g., 802.11g, 802.11n, 3G, 4G). Such scanning, if performed constantly, can quickly run down the batteries on a mobile device.

SUMMARY

This document describes systems and techniques that a mobile computing device may use in order to identify wireless access points (such as WiFi hot spots or other wireless switches or routers) in a vicinity around the device. In general, various factors may prevent a mobile device from identifying all of the wireless access in its area. For example, a scan may be performed in a mode that is designed to create less battery power consumption, so that a device will not recognize a wireless access point that it could otherwise contact under full power. Also, ambient changes around a device may cause it to temporarily lose contact with a wireless access point, such as due to temporary increased solar activity, the device passing through an electric or magnetic field, the device moving past a large dense object, such as a concrete building and the like, and other similar occurrences. In addition, a device may temporarily lose and regain contact with a wireless access point, such as when a user of the device is pacing back and forth in their office or walking through their home.

Because certain of these changes are merely temporary, a system is described here for maintaining particular access points on a list of wireless access points that are maintained on a device, for a certain period after the wireless access points were last identified in a scan by the device. For example, the device may make periodic scans for wireless access points (as opposed to constant scans that may deplete battery power), and when an access point is identified, it may be added to a list of active access points that will be displayed to the user of the device. The access point may be maintained in this active status even after a subsequent scan does not identify the access point, for a certain period in any event. For example, each time the access point is identified in a scan, it may be given a certain value in a list. In subsequent scans, if the access point appears, it may be given the value again, but if it does not appear, the value may be decremented. The access point may be maintained in a list that is displayed to a user of the device until the value hits zero. At that point, the access point may be removed from the list that is displayed to the user and may also be removed from a list stored by the device but not displayed to the user (though the access point may be stored much longer on the hidden lists, such as to provide a log of nearby access points that the user may want to access later).

In this manner, the list of access points that are displayed to a user may reflect the fact that temporary changes in the ability of a device to "see" a particular access point may simply be that, temporary. By maintaining the access points on the list, a user may be allowed to select such access points to connect their device to, even though there is a chance that the access point the user selects has fallen out of range and will not return in the near future. Nonetheless, such a trade off may be one that a user is willing to make in order to increase the number of access points that they are shown, and perhaps to be able to access one that was out of reach based on the most recent scan by the device.

Such techniques may provide one or more advantages in certain implementations. For example, a user may be shown a more complete list of possibly available access points, so that they can find one that works for them (e.g., one that is open and does not require special credentials). Their device may present itself as more stable in terms of network access. The user may also employ the list to move back to a recent location where they did have access to an access point, even if they cannot get connected to the access point now. As a result, although sometimes access points will be listed that are no longer available, such a cost may be considered by the user to be less than the cost of not showing such additional possibly available access points at all. In addition, such an approach allows a device to scan less frequently for access points, and thus conserves battery power in mobile computing devices.

In one implementation, a method for tracking wireless access points from a mobile computing device is disclosed. The method comprises scanning in a first scan to identify wireless access points that are within wireless communication of the mobile computing device and scanning in one or more subsequent scans to identify wireless access points that are within wireless communication of the mobile device. The method further comprises creating a group of wireless access points that includes a combination of wireless access points that were identified in the first scan or in the one or more subsequent scans. The method also comprises providing to a user of the wireless access device a list of wireless access points that includes members of the group of wireless access points that have been identified in a predetermined period of multiple scans for wireless access points.

In some aspects, the predetermined period is measured by a number of scans for wireless access points, by a passage of a predetermined amount of time, or by a distance traveled by the mobile computing device. The method can also include setting a count for a first wireless access point when the wireless access point is identified, changing the count for each subsequent scan for which the wireless access point is not identified, and providing the first wireless access point in the list of wireless access points only if the count has not reached a predetermined expiration value. In addition, the method can include storing counts for each of a plurality of access points in a table, and updating the counts with each scanning for wireless access points. The count for a wireless access point can be decremented if a particular scan does not identify the wireless access point, and the count for the wireless access point can be set to a maximum value of the particular scan does identify the wireless access point.

In some aspects, providing to the user of the wireless access device the list of wireless access points comprises providing a linear list of wireless access point names and meta data about one of more of the wireless access points in the list. Also, the meta data about the one or more wireless access points can comprise information indicating whether each wireless access point was identified in a most recent scan or was saved from a prior scan.

In another implementation, an article comprising a computer-readable data storage medium storing program code that is operable to cause one or more machines to perform operations is disclosed. The operations comprise scanning in a first scan to identify wireless access points that are within wireless communication of the mobile computing device, scanning in one or more subsequent scans to identify wireless access points that are within wireless communication of the mobile device, and creating a group of wireless access points that includes a combination of wireless access points that were identified in the first scan or in the one or more subsequent scans. The operations also include providing to a user of the wireless access device a list of wireless access points that includes members of the group of wireless access points that have been identified in a predetermined period of multiple scans for wireless access points.

In yet another implementation, a mobile computing device is disclosed. The device comprises a wireless interface to repeatedly scan for the presence of wireless access points within contact of the device, and a wireless access manager programmed to track wireless access points identified by the wireless interface and to maintain the tracked wireless access points in a list for a predetermined period after the wireless interface no longer identifies the wireless access points. The device also comprises an electronic display connected to display the wireless access points that are maintained by the wireless access manager.

In another implementation, a mobile computing device is disclosed that includes a wireless interface to repeatedly scan for the presence of wireless access points within contact of the device, means for maintaining, for a predetermined period, a list of wireless access points that includes wireless access points not identified by a most recent scan by the wireless interface, and an electronic display connected to display the maintained list wireless access points.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes systems and techniques for identifying wireless access points that may be within communication distance of a mobile computing device. Such identification may occur even if such access points were not found on a most recent scan performed by the mobile computing device. For example, access points may be maintained on a list of access points that are available for selection by a user (for causing their device to connect to the selected access point) even for several scans after they have no longer been identified, for a certain time period, or for a certain distance of travel by the mobile computing device. For example, if an access point was identified just two scans ago, it can be maintained on a list of access points that the user may select to connect to. Likewise, access points may be maintained for one minute, for example, after they are last identified by scans on a device. Also, access points may be maintained if the user has not moved the device (e.g., as determined by an accelerometer in the portable computing device) or has moved only a certain amount (e.g., as determined by a GPS module on the device, where the GPS was activated for other reasons, and does not, therefore, create an additional battery draw).

Figure 1:
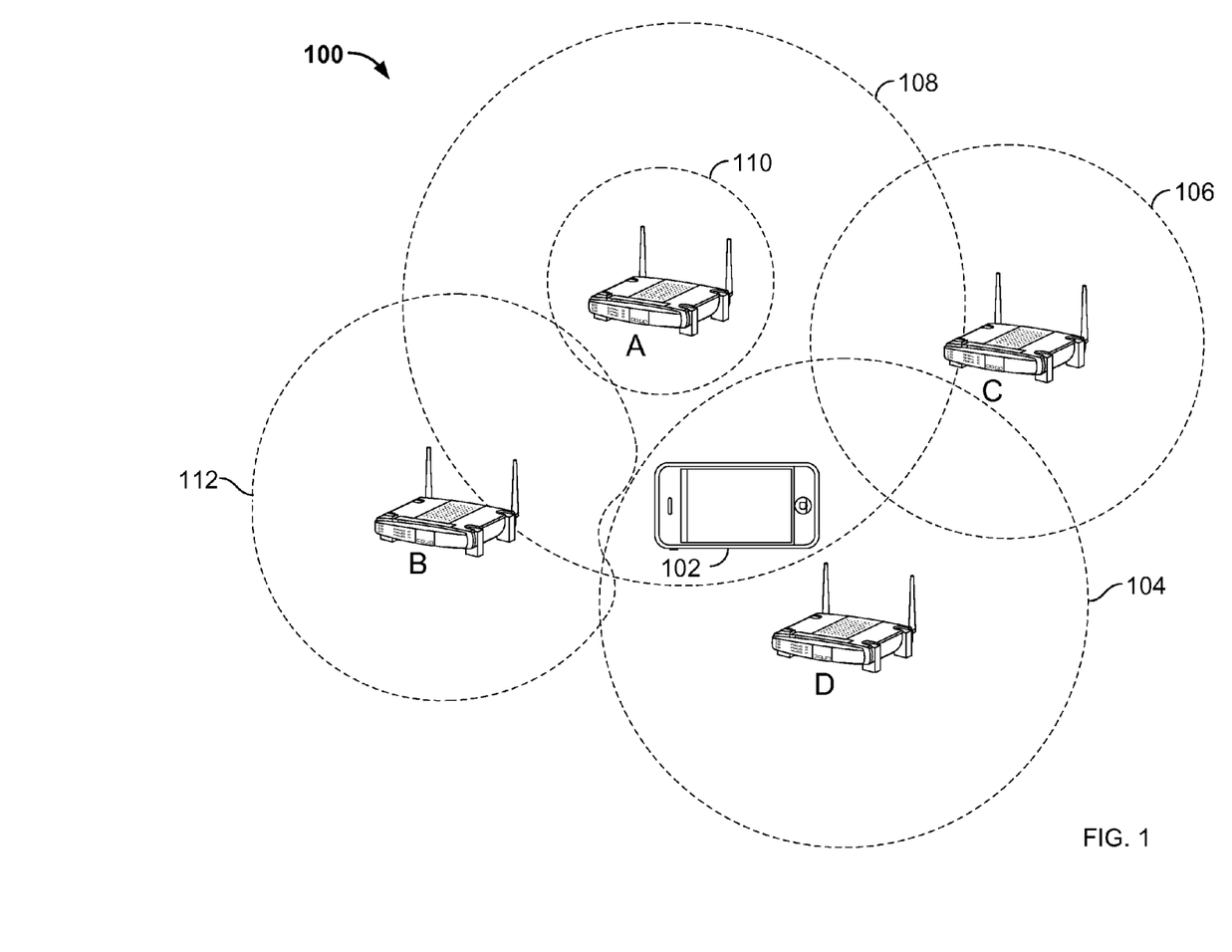
FIG. 1 shows a conceptual diagram of a coverage area for wireless access points.

FIG. 1 shows a conceptual diagram of a coverage area 100 for wireless access points. In general, the figure shows a geographic coverage area 100, which may be several blocks wide, and where background details such as buildings and topography have been removed for clarity. The coverage area 100 is defined by the overlapping zones of coverage for three wireless access points A-D, which may be standard IEEE 802.11x devices or other similar devices through which wireless computing device may communicate to obtain wireless network access. For example, each of the access points A-D may be connected through a service provider to the Internet and may thus be able to provide a wide variety of known services to mobile devices within their individual coverage areas.

A mobile computing device 102 is shown at the center of the area 100, and may include a variety of form factors, including smartphones, netbooks, tablets and the like. The device 102 may include a wireless interface, which may be implemented on a standard chip set that may be made available by a third party to the manufacturer of the device 102.

In this example, the device 102 is shown as being located between each of the four access points A-D in an area that is reached by the coverage zones of each of the access points A and D. The coverage zones are each the geographic areas in which the device 102 may communicate with each of the access points A-D in an expected manner. The interface for the device 102 may be capable of communicating data via multiple mechanisms, such as by BLUETOOTH, by a 3G or 4G wireless network, and by an IEEE 802.11x connection. Each of these communication mechanisms may be complementary to each other and may, in certain circumstances, be employed simultaneously in well-known manners.

The coverage areas are functions of the communication capabilities (transmission and reception) of each access point, the communication capabilities (reception and transmission) of the device 102, and of in some cases of other factors. For example, weather may affect the size of a coverage area. Also, the coverage areas may be different for different devices (some devices simply have better antennae and the like) and may be different at different times for the same device.

Access point D has a coverage area 104 that encompasses the current location of device 102. Thus, when device 102 scans for available access points from its current location, the access point D should be identified by the device 102.

Access point A is shown as having two different coverage areas 108, 110. Coverage area 108 represents a previous coverage area, so that if the device 102 scanned from its current location but at that prior time, the access point A would have registered on the device. However, in the meantime, circumstances have changed so as to reduce the size of the coverage area 108 substantially, to coverage area 110. For example, a solar flare could have affected the access point A or the access point A may have switched into a lower power mode. As a result, device 102 is not currently in the coverage zone 110 for the access point A.

Access point C has a coverage area 106 that does not currently cover device 102, and the same is true of the coverage area 112 for access point B. The coverage area 106 for access point C is a relatively normal circular shape, whereas the coverage area for access point B is non-circular, here indented on the side closest to the device 102. This may be caused by some particular interfering item situated between the access point B and the device 102.

From this figure, it can be appreciate that, if device 102 is moved a small amount or if the environment around the device 102 changes, the coverage maps could shift significantly with respect to the device 102. For example, although device 102 would only register access point D at one moment, the user could walk in one direction, e.g., toward access points A and B, a small amount and register access points A and B, and if access point A expands its coverage are, the device 102 may be able to see communicate with access points A, B, and D. Also, if the user paces back-and-forth moving closer to access point B and further from access point C, then back towards access point C and away from access point B, the device 102 can move in and out of the zone for access point B, and in turn for access point C.

Nonetheless, one can appreciate that a user of the device 102 may want to know about the presence of more than just access point D even though it is the only access point that is currently registering with the device 102. Thus, to the extent the user previously was in one of the other coverage areas when their device performed a scan, identifiers for the relevant other access points can be stored, and the user may be presented with a list of access points that is a merger or superset of the last n scans by their device. Eventually, after a certain period, such as after x number of scans without seeing a particular access point, that access point may no longer be shown to the user.

Figure 2:
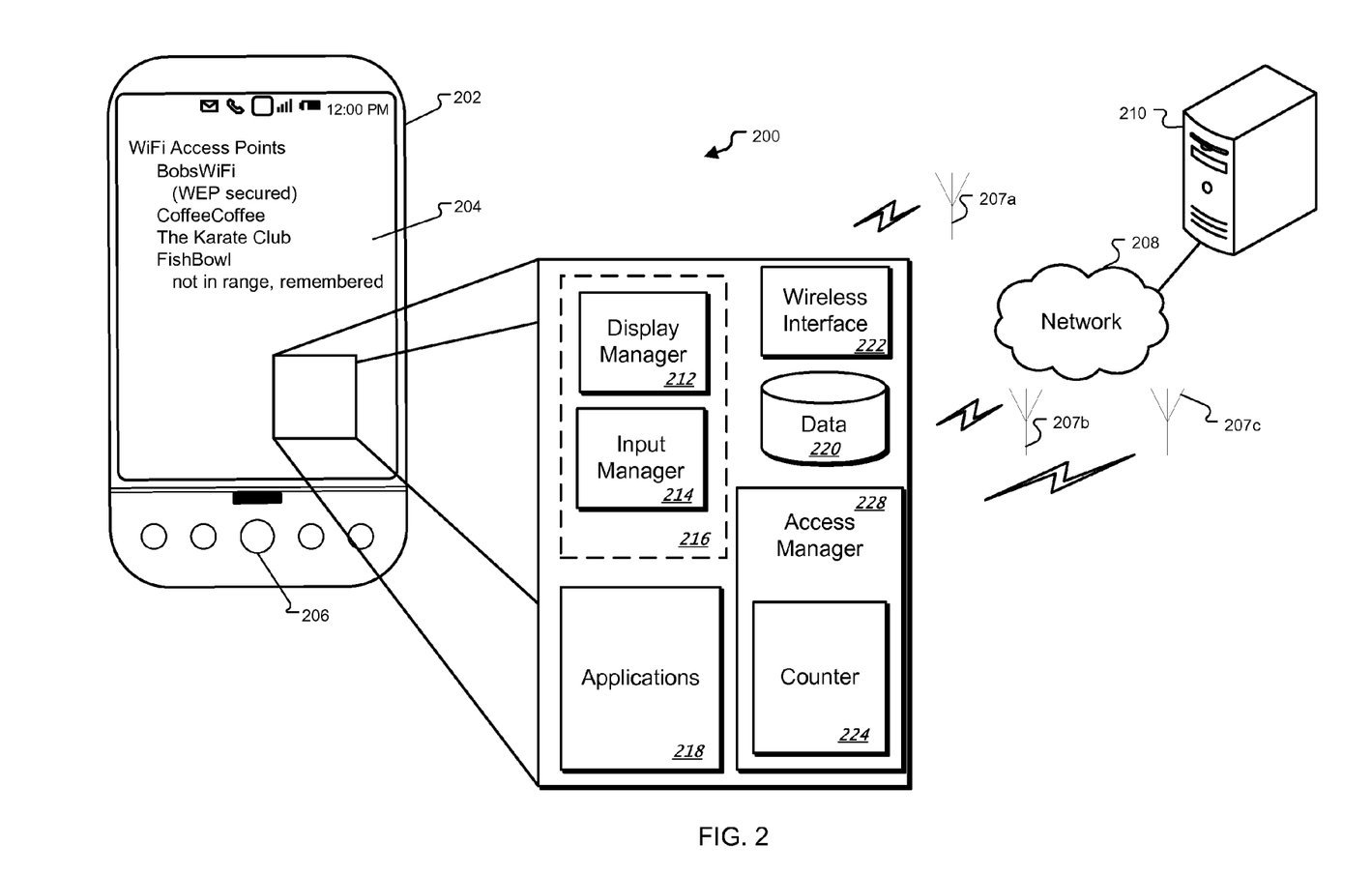
FIG. 2 is a block diagram of a system for tracking communications with wireless access points.

FIG. 2 is a block diagram of a system for tracking communications with wireless access points, such as access points 207a-c. The access points may standard public WiFi access points through which a mobile device 202 may access data from one or more server systems 210 over a network 208, such as the Internet.

The mobile device 202, such as a smart phone, has a touchscreen user interface 204 that can display information to a user. In addition, the device 202 may have alternative input mechanisms, such as a clickable trackball 206 and other selectable buttons, in addition to a physical keyboard that can be uncovered by sliding the display outward, or a virtual keyboard that can be shown in the touchscreen display.

The device 202 may communicate via a wireless interface 222, which may be implemented as a chipset that carries out the various standard networking layers. For example, the interface 222 may identify other wireless devices within communication range of the device and may wirelessly transmit data to and receive data from the identified other wireless devices. The interface 222 may also perform handshaking with other devices so as to establish an appropriate communication protocol, rate, and timing for communications between the devices, in a familiar manner. Moreover, the interface 222 may perform a network scanning function to identify other wireless devices that are within range of the device 202. The device 202 can communicate with other wireless devices based on identification of the other wireless devices by the interface 222. Such scanning may also be performed in a familiar manner and may be performed as active scanning so as to reduce the power that is consumed from scanning, as compared to continuous scanning for other wireless devices in the area.

Interactions that a user has with a device may take a wide variety of forms, using, for example, applications 218 that may be shipped with the device 202 when it is purchased and applications that a user can purchase after-the-fact, such as from an on-line application store. Such applications may have needs for data stored remotely, and may thus make a request to connect to one or more access points automatically. The operating system of the device 202 may also attempt such connections, and a user may seek to make such connections manually so that the user can have control over the access point that is used. For example, the user may prefer to use a free, open access point, or instead may prefer to use an access point that is secure, and would not want to be connected automatically and without knowing, to an unsecure network.

The display 204 shows information that might be displayed to a use of the device 202 from a screen of the device's operating system. The particular information is a list of names of wireless access points that a user may attempt to connect to. The first access point has a name of "BobsWiFi" and may represent a hot spot at a private office near the device 202. The access point is shown as being WEP secured, so the user of device 202 may not even wish to try to connect to that network. Separately, access points for the CoffeeCoffee shop are shown, and for The KarateClub karate school. Both access points are open, because they do not show any additional meta data about the points in the list.

A fourth access point is listed, and the meta data shown with the name or title of the access point indicates to the user that the access point was not identified in the most recent scan by the device 202. In particular, the meta data notes "not in range, remember," to indicate to the user that the FishBowl access point was previously identified by the device 202, but that it was not identified in a most recent scan by the device 202. The user may attempt to connect to the FishBowl access point, such as if the user knows where that access point is, and they think they have moved closer to it since the last time their device 202 performed a scan.

A number of components running on one or more processors in the device 202 may give a user the option to interact with the device 202, including to review available access points for wireless communication. For example, an interface manager 216 may manage interaction with the touchscreen interface 204, and may include a display manager 212 and an input manager 214.

The display manager 212 may manage what information is output—i.e., what is shown to a user via interface 204. For example, an operating system on the device 202 may employ display manager 212 to arbitrate access to the interface 202 for a number of applications 218 that are running on the device 202. In one example, the device 202 may display a number of applications, each in its own window, and the display manager 212 may control what portions of each application are shown on the interface 202 and which are hidden.

The input manager 214 may control inputs—e.g., data that is received from a user via the touchscreen 204 or other input mechanisms. For example, the input manager 214 may coordinate with the display manager 212 to identify where, on the display, a user is currently entering information so that that the device may understand the context of the input. For example, coordination may be formed between an absolute location on the display that a user touches, and an underlying location on an item that is shown on the display. In addition, the input manager 214 may determine which application or applications should be provided with the input. For example, when the input is provided within a text entry box of an active application, data entered in the box may be made available to that application. Likewise, applications may subscribe with the input manager so that they may be passed information entered by a user in appropriate circumstances.

A data base 220 may also be provided on the device to track information about wireless access points that have been identified in the past by the device 202 using the wireless interface 222. For example, the data base 220 may store a table or other data structure that identifies information for various access points, and indicates how long it has been (e.g., number of scan cycles) since each access point has been identified. The information stored for each access point may be obtained from the particular access point, and may include an indication of the security level for the access point, a MAC address for the access point, and a name, which may be a descriptive alphanumeric textual name assigned by an administrator of the access point.

An access manager 228 controls which access points are listed on the display 204, and causes a connection to be attempted with any access point that a user of the device 202 selects. The access manager 228 may gather the information about access points discussed above and may manage the data structure in the data base 220 that keeps track of what access points have been identified and when.

A counter 224 that is part of the access manager 228 keeps track of the time that has passed since each access point was last identified by the device 202. In particular, the counter can set a predetermined count level each time a scan is performed and a particular access point is located. The counter may decrement the count each time a scan is subsequently performed and the access point is not identified. When the count reaches zero, the display 204 may stop displaying the particular access point, under the assumption that the access point has been inaccessible long enough that it is not sufficiently likely to return in the near future or otherwise be accessible for data transfer with the device 202.

Figure 3:
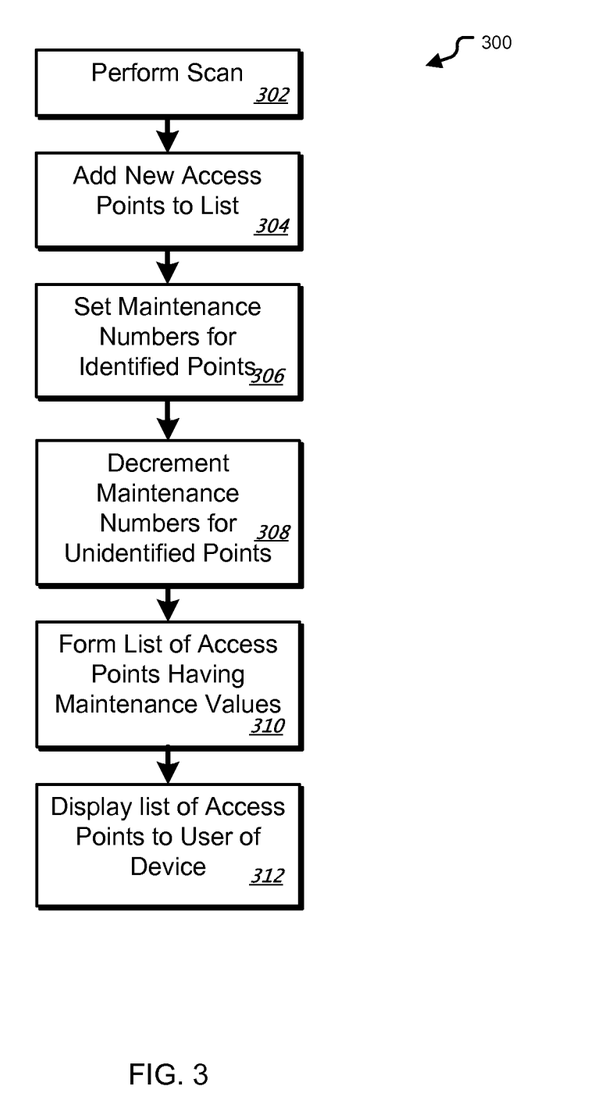
FIG. 3 is a flowchart of an example process for tracking communications with wireless access points.

FIG. 3 is a flowchart of an example process 300 for tracking communications with wireless access points. In general, the process 300 involves setting a value for a wireless access point on a mobile device whenever the wireless access point is identified in a scan for nearby points, and to change the value (e.g., decrement it) each time a cyclical scan occurs and the access point is not identified. In this manner, various access points may be maintained in a group or list even if they have not been heard from in a short time, and may eventually be moved off the list after an adequate period. The process 300 can be performed by a variety of computing devices, such as the device 102 described above with regard to FIG. 1 and/or the mobile device 202 described above with regard to FIG. 2.

The process 300 is shown here as a linear process. The process 300 may be repeatedly performed, where the scanning occurs at particular points in a repeating period of time, such as every 10 seconds, 20 seconds, 30 seconds, one minute, two minutes, five minutes, and other periods of time. For example, every two minutes the process 300 can scan for access points and adjust the list of active access points according to the techniques described in this document.

Time periods used for repeatedly performing the process 300 can be adjusted based on a variety of factors, such as a distance traveled by the mobile device since the last time the process 300 was performed. For example, if a mobile device is currently running the process 300 every minute and the mobile device has been stationary since the last time the process 300 was performed, the time period may be lengthened (e.g., changed to two minutes). In another example, if a mobile device is currently running the process 300 every five minutes and the mobile device has traveled at least a threshold distance (e.g., 25 feet, 100 feet, a quarter mile, one mile) since the last time the process 300 was performed, then the time period can be shortened (e.g., changed to three minutes). Distance traveled can be determined by a mobile device using a variety of techniques, such as monitoring changes in GPS coordinates for the mobile device.

The process 300 begins at box 302, where a device performs a scan for access points in a local area in a known manner. The scan may result in information being obtained about access points in the area, and such information may be stored by the device. At box 304, the process 300 adds new access points to a list of active access points, which are the access points that will be shown to a user of the device (or, in some circumstances, provided to an application running on the device, among other things). At box 306, maintenance numbers may then be set for all the access points on the tracking list, both new and old. Access points that were identified in the most recent cycle may be assigned a maximum value, such as an integer value of 4.

At box 308, the maintenance numbers for unidentified access points may be decremented. Thus, for example, an access point that was identified two cycles ago but has not been heard from since may have previously had its number decremented form 4 to 3, and in this cycle may have it reduced again to 2. The process 300 then forms an active list of access points from the points that are indicated as having positive maintenance values. Thus, any points that have fallen to zero (an example expiration value) will not be shown to a user of the device or passed to an application on the device. The maximum integer value (4) and expiration value (zero) discussed above are one example of values that can be used to monitor for and maintain an active list of access points. A variety of integer and expiration values can be used. For example, a maximum value assigned to access points identified in the most recent cycle can be any of a variety of values, such as 5, 8, 10, 16, 25, 32, 50, 64, 100, and 1000. Various expiration values can also be used, such as −10, −4, zero, 4, and 10.

Figure 4:
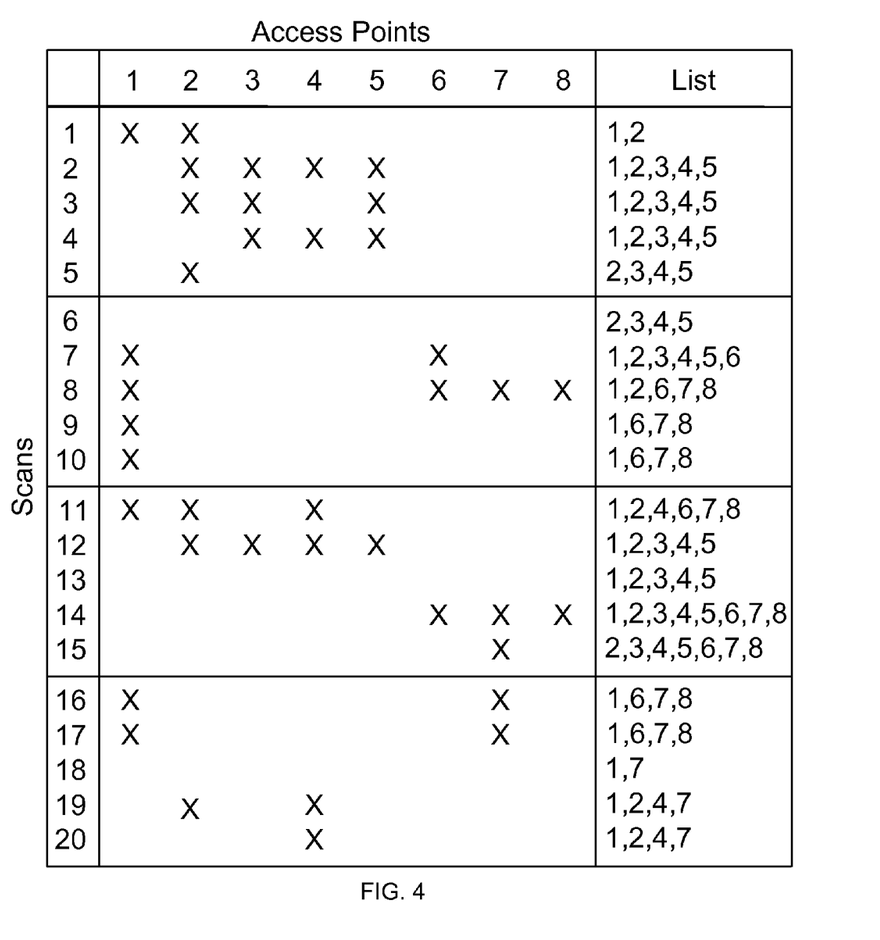
FIG. 4 is a table that represents tracking of wireless access points with which a mobile computing device may communicate.

FIG. 4 is a table that represents tracking of wireless access points with which a mobile computing device may communicate. The table is arranged to show an example of how a mobile computing device may move around an area that holds eight different wireless access points, and may from time-to-time gain or lose connection to those access points. In the table, twenty different scans are shown along the left edge, representing discrete sequential instances in which the mobile device scanned for the presence of access points in the area around the device. X's are shown under numbers for each of the eight access points so as to indicate that the particular access point was or was not identified for a particular scan cycle. And a "List" is shown to indicate which of the access points, using the techniques described here, will be shown to a user of the device. In this example, the "decay" for an access point—the number of scan cycles that it takes, without hearing from an access point, before the access point is removed from the active list—is four.

Thus, in a first scan, the first two access points are identified, and in subsequent scans, additional points are identified, and some are not identified for one or more cycles. For example, access point 1 is not identified in cycles 2-4, an access point 2 is not identified in cycle 4, but that does not cause them to fall off the list. Rather, the process is arranged to keep them on the list so that the user can see that they were recently in the vicinity, and so that the user can attempt to make contact with them (e.g., simply by forcing a negotiation session with them, or by moving to an area that the user believes to be better for communication, and then forcing the negotiation or manually instigating a new scan).

Scan cycle 13 is notable because it identified no access points. However, the list still includes five different access points because they had been identified in recent prior cycles. However, such access points that were not identified in the current cycle may be display in a manner that is different than those that have been identified in the most recent cycle, such as in the manner shown on display 204 in FIG. 2.

The particular manner of arranging information here is provided for illustrative purposes. An actual data structure may be arranged to include a unique identifier for each access point, information about the access point (e.g., MAC address), and an integer field with a counter value that tracks whether the particular access point should be considered to be part of the active list of access points. Such a data structure may then have its fields (and particularly the counters) updated with each scanning cycle. The counter may then be analyzed in order to determine which records in the data structure to display to a user in an active list of access points.

Figure 5:
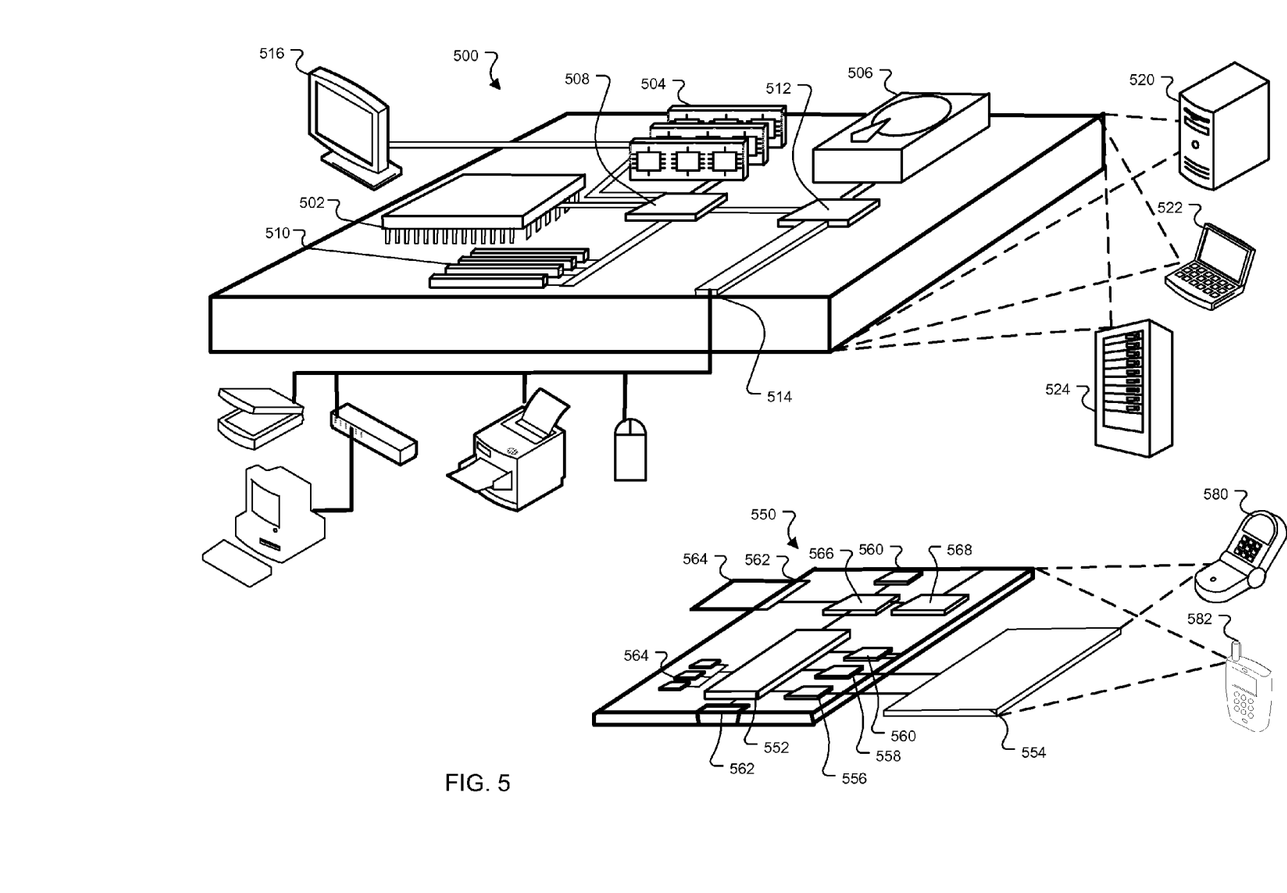
FIG. 5 shows an example of a computer device and a mobile computer device that can be used to implement the techniques described here.

FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, memory on processor 502, or a propagated signal.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to a telephone dialing application, but other forms of applications and keypad layouts may also be addressed, such as keypads involving graphical icons and macros, in addition to alphanumeric characters.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method for tracking wireless access points from a computing device, the method comprising:
   scanning in a first scan to identify wireless access points that are within wireless communication of the computing device;
   scanning in a subsequent scan to identify wireless access points that are within wireless communication of the computing device;
   creating a group of wireless access points that includes a combination of
      (i) one or more first wireless access points that were each identified in the first scan and not in the subsequent scan, and
      (ii) one or more second wireless access points that were each identified in the subsequent scan; and
   displaying a list of user-selectable items that correspond to particular wireless access points from the group of wireless access points that have been identified in a period of multiple scans for wireless access points, the displayed list indicating that one or more of the particular wireless access points were identified in a prior scan and not identified in a most recent scan for wireless access points,
   wherein a time between the first scan and the subsequent scan is lengthened or shortened according to a distance traveled by the computing device.

2. The method of claim 1, wherein the period is determined by a number of scans for wireless access points.

3. The method of claim 1, wherein the period is determined by a passage of a predetermined amount of time.

4. The method of claim 1, further comprising setting a count for one of the first wireless access points when the wireless access point is identified, changing the count for each subsequent scan for which the wireless access point is not identified, and providing the one of the first wireless access points in the list of wireless access points only if the count has not reached a predetermined expiration value.

5. The method of claim 4, further comprising storing counts for each of a plurality of access points in a table, and updating the counts with each scan for wireless access points.

6. The method of claim 5, wherein a count for a wireless access point is decremented if a particular scan does not identify the wireless access point, and the count for the wireless access point is set to a maximum value of the particular scan does identify the wireless access point.

7. The method of claim 1, further comprising determining the distance traveled by the computing device by monitoring changes in GPS coordinates for the computing device.

8. An article comprising a non-transitory computer-readable data storage medium storing program code that is operable to cause one or more computers to perform operations, the operations comprising:
   scanning in a first scan to identify wireless access points that are within wireless communication of a computing device;
   scanning in a subsequent scan to identify wireless access points that are within wireless communication of the computing device;
   creating a group of wireless access points that includes a combination of
      (i) one or more first wireless access points that were each identified in the first scan and not in the subsequent scan, and
      (ii) one or more second wireless access points that were each identified in the subsequent scan; and
   displaying a list of user-selectable items that correspond to particular wireless access points from the group of wireless access points that have been identified in a period of multiple scans for wireless access points, the displayed list indicating that one or more of the particular wireless access points were identified in a prior scan and not identified in a most recent scan for wireless access points,
   wherein a time between the first scan and the subsequent scan is lengthened or shortened according to a distance traveled by the computing device.

9. The article of claim 8, wherein the period is determined by a number of scans for wireless access points.

10. The article of claim 8, wherein the period is determined by a passage of a predetermined amount of time.

11. The article of claim 8, wherein the operations further comprise setting a count for a first wireless access point when the wireless access point is identified, changing the count for each subsequent scan for which the wireless access point is not identified, and providing the first wireless access point in the list of wireless access points only if the count has not reached a predetermined expiration value.

12. The article of claim 11, wherein the operations further comprise storing counts for each of a plurality of access points in a table, and updating the counts with each scan for wireless access points.

13. The article of claim 12, wherein a count for a wireless access point is decremented if a particular scan does not identify the wireless access point, and the count for the wireless access point is set to a maximum value of the particular scan does identify the wireless access point.

14. The article of claim 8, wherein the operations further comprise determining the distance traveled by the computing device by monitoring changes in GPS coordinates for the computing device.

15. A computing device comprising:
   a wireless interface to repeatedly scan, with time between scans, for the presence of wireless access points within wireless communication of the computing device;

a wireless access manager programmed to track wireless access points identified by the wireless interface and to maintain the tracked wireless access points in a list for a period after the wireless interface no longer identifies the wireless access points; and an electronic display connected to the computing device to display at least some of the wireless access points that are maintained by the wireless access manager, wherein the electronic display is to provide a linear list of user-selectable items that correspond to the at least some of the wireless access points that have been identified in a period of multiple scans for wireless access points, the displayed list indicating that one or more of the at least some wireless access points were identified in a prior scan and not identified in a most recent scan for wireless access points, wherein the time between scans is lengthened or shortened according to a distance traveled by the computing device.

16. The computing device of claim 15, wherein the wireless access manager is programmed to determine the distance traveled by the computing device by monitoring changes in GPS coordinates for the computing device.

17. The computing device of claim 15, wherein the wireless access manager is further programmed to set a count for a first wireless access point when the first wireless access point is identified, change the count for each subsequent scan in which the first wireless access point is not identified, and provide the first wireless access points in the list only if the count has not reached a predetermined expiration value.

18. The computing device of claim 17, wherein the wireless access manager is further programmed to store counts for each of a plurality of access points in a table and update the counts with each scan for wireless access points.

19. The computing device of claim 18, wherein the wireless access manager is further programmed to decrement a count for a wireless access point if a particular scan does not identify the wireless access point and set the count for the wireless access point to a maximum value if the particular scan does identify the wireless access point.

20. The computing device of claim 15, further comprising an accelerometer, wherein the wireless access manager is further programmed to determine the distance traveled by the computing device by monitoring the accelerometer.

21. The computing device of claim 15, wherein the wireless access manager is further programmed to determine the distance traveled by the computing device by monitoring changes in GPS coordinates for the computing device.

* * * * *